United States Patent [19]

Freeman

[11] Patent Number: 5,142,811
[45] Date of Patent: Sep. 1, 1992

[54] FISHING LURE AND LURE ENHANCEMENT KIT

[76] Inventor: Carl W. Freeman, 1417 Jane Ave., Flint, Mich. 48506

[21] Appl. No.: 680,542

[22] Filed: Apr. 4, 1991

[51] Int. Cl.⁵ .............................................. A01K 85/00
[52] U.S. Cl. .................................. 43/42.53; 43/42.06; 43/42.24; 43/42.36
[58] Field of Search ................ 43/42.53, 42.06, 42.36, 43/42.24

[56] References Cited

U.S. PATENT DOCUMENTS

| 2,091,457 | 8/1937 | Sauer. | |
| 2,167,334 | 7/1939 | Hayes | 43/42.36 |
| 2,423,717 | 7/1947 | Mikina. | |
| 2,791,058 | 5/1957 | Bettini. | |
| 2,836,001 | 5/1958 | Silen | 43/42.06 |
| 3,280,497 | 10/1966 | Tschida. | |
| 3,758,976 | 9/1973 | Szwolkon | 43/42.24 |
| 3,890,735 | 6/1975 | Senill | 43/42.24 |
| 4,167,076 | 9/1979 | Weaver | 43/42.24 |
| 4,211,027 | 7/1980 | Viscardi | 43/42.24 |
| 4,253,263 | 3/1981 | Franklin | 43/42.36 |
| 4,858,368 | 8/1989 | Tolner | 43/42.36 |

FOREIGN PATENT DOCUMENTS 8900007 2/1989 PCT Int'l Appl. .

Primary Examiner—Kurt Rowan
Attorney, Agent, or Firm—Learman & McCulloch

[57] ABSTRACT

A fishing lure comprises a soft, plastic body having an elongated passage extending therethrough. An elongated tubular casing is received in the passage and includes a bore having an open leading end and an open trailing end. A length of fishing line is received in the bore through its open leading end. A shank portion of a hook is disposed in the bore through the open trailing end and is connected to the line in the bore.

22 Claims, 2 Drawing Sheets 5,142,811

FISHING LURE AND LURE ENHANCEMENT KIT

FIELD OF THE INVENTION

The present invention relates to fishing lures and, more particularly, to a fishing lure having a body with a tubular casing extending therethrough for receiving a fishing line and shank portion of a hook internal of the lure and providing water flow internal of the lure. A lure enhancement kit is also disclosed.

BACKGROUND OF THE INVENTION

In the fishing lure art, there has been a proliferation of various types of artificial lures having bodies made of soft, life-like, plastic and imitating various types of natural baits, such as worms, night crawlers, grubs, toads, crawfish, minnows, etc. upon which gamefish prey. These artificial lures are made (e.g., molded) in a wide range of colors and specific shapes in an attempt to attract fish of particular types under the particular water and light conditions encountered by the fisherman.

Fishermen typically carry in a tackle box the soft, plastic artificial lures described above and also hard-bodied wood, metal or plastic artificial lures that typically resemble small fish or other creatures upon which larger gamefish pray. These hard bodied lures are also made in a wide range of colors and specific shapes to attract fish under various water and light conditions.

In the never ending pursuit of improving the fisherman's prospect of catching fish, numerous fish attracting scents have been developed for application to fishing lures of the types described above so as to be dispensed into the water as the lure is pulled therethrough. Some types of scent are applied to the exterior of the lure as a liquid spray coating while others are provided as a liquid or solid material in the interior of the lure. U.S. Pat. Nos. 2,091,457; 2,836,001; and 3,280,497 as well as PCT application No. PCT/IT89/7 (publication No. WO89/07393) illustrate various approaches to providing a fish attracting scent in the interior of fishing lures of the hard-bodied type described above. U.S. Pat. No. 2,791,058 illustrates a fish attracter for dispensing a fish attracting scent from the interior of a hollow body as it is pulled through the water.

Although the lures described above are widely and successfully used with or without a scent dispensing material thereon, there is a continuing desire for a lure having a variety of fish attracting capabilities to accommodate particular water and light conditions encountered by the fisherman as well as the particular type of fish to be caught. In particular, enhancement of the capabilities of the soft, lifelike, plastic lures described above in attracting fish under particular water and light conditions encountered would be desirable and welcomed by fishermen.

It is an object of the present invention to provide a fishing lure, method of making same, and a lure enhancement kit which seek to satisfy these desires.

SUMMARY OF THE INVENTION

The present invention provides a fishing lure comprising a body of appropriate configuration (e.g., a worm, night crawler, or shape of other live bait) and including an elongated passage extending through the body. The passage receives a tubular casing or sleeve having a bore with an open leading end and an open trailing end. A length of fish line (e.g., nylon leader) is received in the bore through the open leading end. A hook includes a shank portion received in the bore through the open trailing end and connected to the fish line in the bore. An optional retainer member, such as a retainer bead or ball, can be slidably mounted on the line proximate the open leading end of the bore so as to bear thereagainst to bias the open trailing end against the hook when the lure is pulled through the water. The size/shape of the retainer member can be selected to partially close off the open leading end of the bore to meter flow of water therethrough in given manner.

The lure of the present invention preferably includes a body made of soft, plastic of the type in widespread use for artificial lures, such as plastic worms and night crawlers. The tubular casing or sleeve is received in an elongated passage pierced in the soft body using a suitable tool or, alternately, molded in-situ therein. The casing or sleeve is made of metal, plastic, or other material so as to define a substantially non-collapsible passage through the soft body for receiving the fish line and the shank portion of the hook.

In one embodiment of the invention, the bore defined by the casing or sleeve provides a flow path for water through the interior of the lure body as the lure is pulled through the water to impart a fish attracting noise and movement thereto. The retainer member, if used, can be used to provide a desired water flow rate through the bore.

In another embodiment of the invention, a replaceable dispenser of fish attractant, such as scent or color, is received in the bore along with the length of line and shank portion of the hook. As the lure is pulled through the water, water enters the open leading end of the bore and flows past the attractant so as to extract an amount of the scent or color from the dispenser for discharge through the open trailing end as the water exits the bore for dispersal behind the lure. The retainer member can be used to meter a relatively low water flow rate through the bore so as to prolong the effective life of the dispenser. Preferably, the replaceable dispenser comprises a length of pipe cleaner having the fish attractant absorbed or otherwise carried thereon. A plurality of different scented and/or colored pipe cleaner dispensers can be provided to allow the fisherman to choose a scent or color most appropriate for the fishing conditions encountered.

The present invention also provides a lure enhancement kit especially adapted to enhance the capabilities of a soft, plastic-bodied lure, such as worm, night crawler, etc. that the fisherman already possesses. In particular, the kit includes a length of the aforementioned casing or sleeve, a length of flexible line to which a hook is attached at one end, and an optional retainer member and attractant dispenser for insertion in the casing after it is disposed in the soft lure body. The kit can be used to modify an existing conventional soft, plastic-bodied lure by piercing an elongated passage through the soft body using a suitable tool, such as a pointed punch, simultaneously inserting the casing in the passage being formed, removing the punch, and then passing the line through the bore of the casing until the shank portion of the hook is nested inside the casing. If present, the retainer member is slidably mounted on the line so that it can be brought to bear on the open leading end of the sleeve bore as described above when the lure is pulled through the water. In addition, a fish attractant dispenser, if provided with the kit, can be inserted in the bore to dispense scent or color, at the preference of the fisherman, as the modified lure is pulled through the water.

The objects and advantages of the present invention enumerated above will become more readily apparent from the following detailed description and drawings.

DETAILED DESCRIPTION OF THE INVENTION

Figure 1:
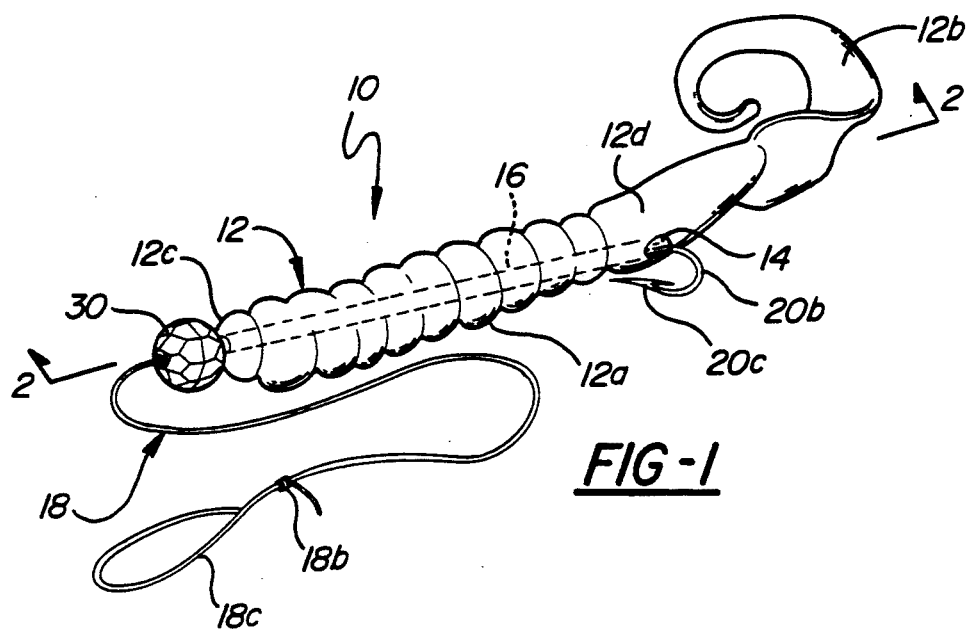
FIG. 1 is a perspective view of a fishing lure in accordance with one embodiment of the invention.
Figure 2:
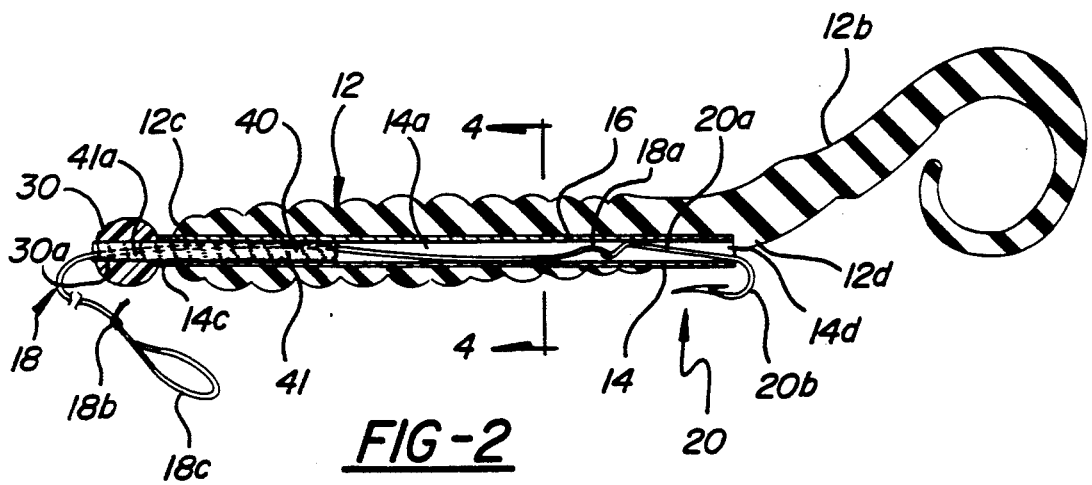
FIG. 2 is a longitudinal sectional view of the lure of FIG. 1 taken along line 2—2.

FIGS. 1 and 2 illustrate a fishing lure 10 in accordance with one embodiment of the invention wherein the lure 10 comprises a night crawler-shaped body 12 having a main, bulky body portion 12a and a thin tail-like portion 12b that undulates as the lure is pulled through the water by the fisherman. The night crawler-shaped body 12 comprises a soft, flexible, life-like, plastic material currently used in the manufacture of artificial worm and night crawler lures sold under various trademarks, such as SIDEWINDER and SQUIRMIN' WORM by Bass Pro Shops, Springfield, Mo.

An elongated, tubular, cylindrical casing 14 is received in an elongated, cylindrical passage 16 in the bulky body portion 12a. The passage 16 typically is formed so as to extend between a leading portion 12c and a trailing portion 12d of the bulky body portion 12a. The passage 16 is formed in the bulky body portion 12a by piercing the body portion with a suitable tool, such as a pointed punch T (as explained below), although the passage 16 can be molded in-situ in the bulky body portion 12a.

The casing 14 includes a longitudinal bore 14a having an open leading end 14c and an open trailing end 14d proximate the respective leading and trailing portions 12c, 12d of the bulky body portion 12a. The casing 14 is immovably disposed in the passage 16 as a result of being in friction fit with the body portion 12a. The casing 14 is constructed of metal, plastic or other material to be strong enough to prevent collapse of the casing 14 from forces exerted on the soft-bodied lure during its handling and use as would substantially close off the bore 14a. A length of steel tubing or a length of plastic drinking straw can be used as the casing 14 in the practice of the invention.

Received in the bore 14a of the casing 14 through the open leading end 14c is a length of fish line 18, which typically comprises a nylon or other flexible plastic or metal leader having one end 18a tied or otherwise fastened to the elongated shank portion 20a of a hook 20 and an opposite end 18b configured into a loop 18c so as to be connected via a conventional lock snap swivel (not shown) or other connecting means to the primary fish line (not shown) that extends to the fishing rod/reel in a manner well known to a fisherman. The hook 20 is shown including the shank portion 20a received in the bore 14a through the open trailing end 14d and an arcuate portion 20b terminating in a barbed hook tip 20c. The casing 14 facilitates installation of the fish line 18 through the soft, plastic lure body 12.

As shown in the FIGS. 1-2, when the lure components are assembled for use, the elongated shank portion 20a of the hook 20 is inside the casing bore 14a through the open trailing end 14d. Typically, the lure 10 is initially assembled by the lure manufacturer with the hook 20 fastened to the end 18a of the line 18. The line is then passed through the open trailing end 14d of the bore 14a so as to emerge through the open leading end 14c thereof to be accessible to the fisherman. When the fisherman desires to use the lure 10, he connects the accessible looped end 18c of the line 18 to the 14 along the line 18 until the open trailing end 14d engages (abuts) the arcuate portion 20b of the hook 20. The lure can then be cast into the water. As the lure is pulled through the water, the body 12/casing 14 will remain biased toward the arcuate hook portion 20b by action of the flowing water thereagainst.

Preferably, the lure 10 includes one or more retainer beads or other members 30 (one shown) leading end 14c of the casing bore 14. The retainer member 30 includes a bore 30a therethrough to receive the line 18 to this end. As the lure is pulled through the water, the retainer member 30 is biased against the open leading end 14c by action of the water thereagainst to maintain the open trailing end 14d biased against the arcuate hook portion 20b. This bias prevents the hook 20 from swiveling as the lure 10 is pulled through the water. Moreover, the retainer member 30 is also sized/shaped to close off the open leading end 14c to a preselected partial extent to meter flow of water through the bore 14a as the lure is pulled through the water. The retainer member 30 also helps to prevent snagging of the sleeve 14 on weeds.

The lure 10 optionally may include an elongated, replaceable fish attractant dispenser 40 that can be inserted into the casing 14 through the open leading end 14c. The dispenser 40 preferably comprises a length of pipe cleaner 41 bearing a fish attracting scent or color. The pipe cleaner 41 includes a leading end 41a received in friction fit in the bore 30a of the retaining member 30 as best shown in FIG. 2. The fisherman can insert/remove the pipe cleaner 41 into/out of the bore 14a by grasping the retainer member 30.

The scenting or coloring agent is typically applied to the pipe cleaner 41 at the lure manufacturing factory. When the lure is subsequently used in the water, the dispenser (pipe cleaner) is contacted by the water passing through the bore 14a such that the scent or color agent is extracted therefrom. In particular, as the lure 10 is pulled through the water, water enters the open leading end 14c of the bore 14a as metered by the retaining member 30. The water flows through the bore 14a and around the dispenser 40 to extract the scenting or coloring through the open trailing end 14d of the bore 14a to disperse the scenting or coloring agent in the water behind the lure 10 to attract fish thereto.

Various scenting agents or coloring agents can be used in practicing the invention. Representative of scenting agents usable in the invention are anise, berkley, Dr. Juice, or other scents. Representative of coloring agents usable in practicing the invention are Loran Oils extra strength liquid and Durkee's, McCormick, or Betty Crocker food coloring. The invention envisions providing a plurality of scent and/or color dispensers 40 in a package with the lure 10 to allow the fisherman to select a particular scent or color suited to the fishing conditions encountered and the type of fish to be caught.

As will apparent from the description above, the soft, plastic-bodied lure 10 described above may be used in a variety of modes. For example, the lure can be used without a scent or color dispenser 40 in the sleeve 14 to allow water flow through the bore 14a to impart a desired sound and motion to the lure 10 as it is pulled through the water. Alternately, the lure can be used with a particular scent dispenser 40 in the casing 14. In addition, the lure can be used with a particular color dispenser 40 in the casing 14. The overall fish attracting capabilities of the soft, plastic-bodied lure 10 are thereby increased to the benefit of the fisherman.

Figure 3:
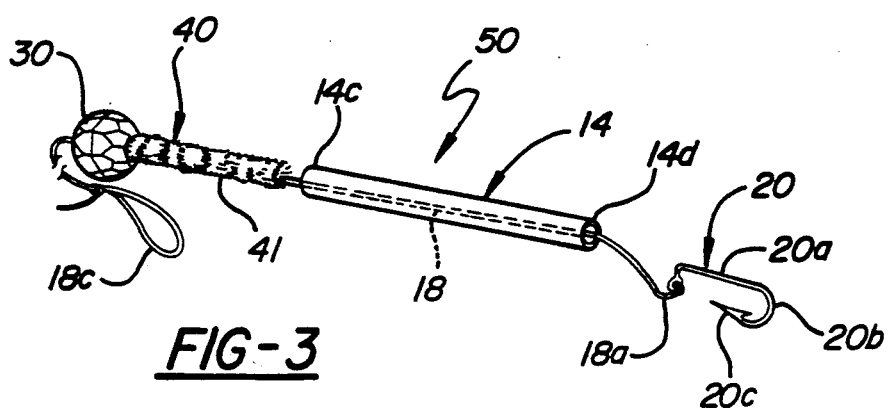
FIG. 3 is an exploded view of a lure enhancement kit in accordance with one embodiment of the invention.
Figure 4:
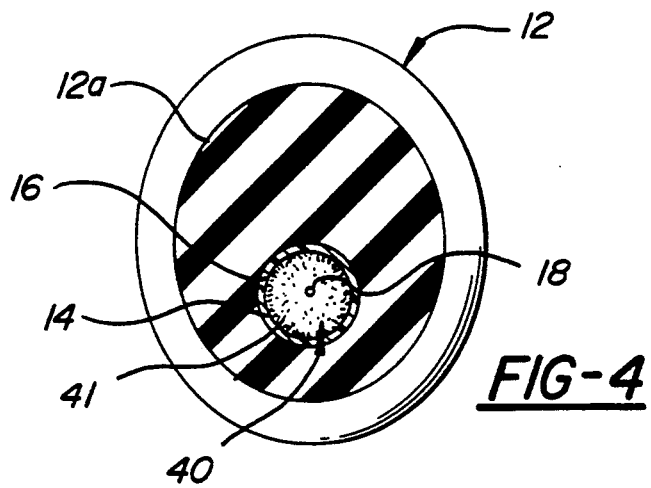
FIG. 4 is a sectional view taken along line 4—4 of FIG. 2.

The present invention also provides a lure enhancement kit 50, FIG. 3, which can be used to modify a conventional soft, plastic-bodied lure to include the features of the invention. For purposes of illustration, an aforementioned soft, plastic-bodied worm or night crawler sold under the trademark SIDEWINDER by Bass Pro Shops, can be modified in accordance with the kit 50 of the invention. The kit 50 includes the casing 14, line 18 fastened to hook 20, and the optional retaining member 30 and dispenser 40 described above.

Figure 5:
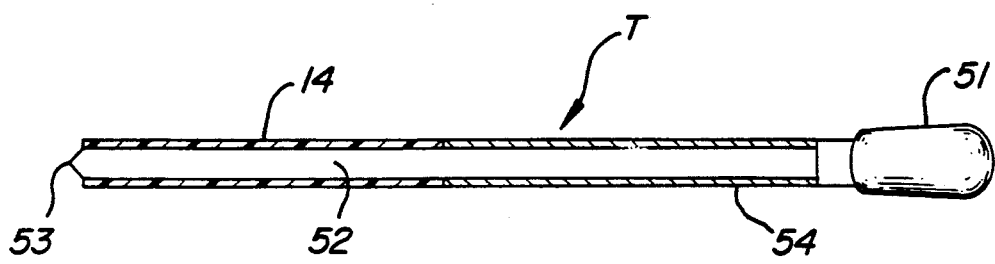
FIG. 5 is a sectional view of a tool and related parts for use in inserting a casing in a lure.
Figure 6:
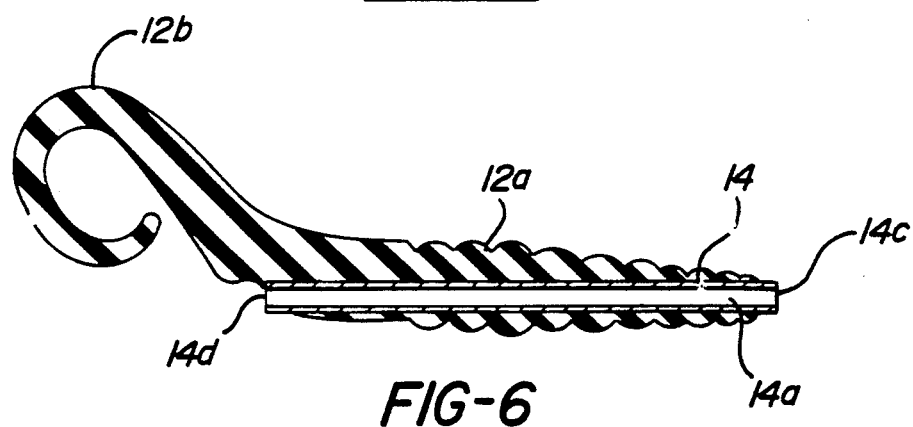
FIGS. 6 and 7 are sectional views showing successive steps for making a soft, plastic-bodied lure in accordance with one embodiment of the method of the invention.
Figure 7:
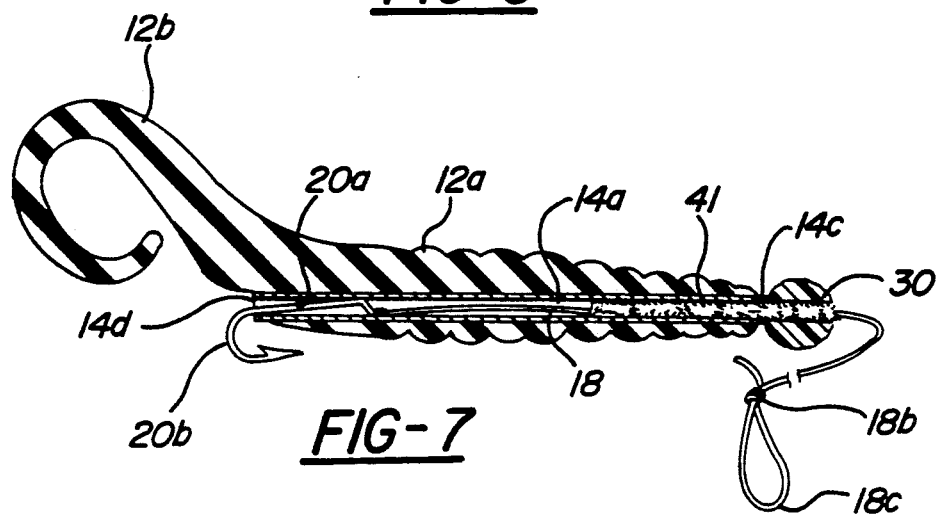

FIGS. 5, 6 and 7 illustrate apparatus and method for assembling the kit 50 with the lure in accordance with one embodiment of the invention. In particular, a suitable tool T comprises a handle 5 from which extends a cylindrical shank 52 terminating at one end in a sharp point 53. A metal sleeve 54 is fitted onto the shank and abuts the handle 51. The casing 14 is fitted onto the shank 52 between the sleeve 54 and the point 53. The diameter of the sleeve 54 preferably corresponds to the diameter of the casing 14. The assembly of the shank, the casing, and the sleeve 54 is pushed through the bulky body portion 12a to form (pierce) the passage 16 therein and simultaneously insert the casing 14 in the passage 12. The shank 52 then is withdrawn from the casing and the body, FIG. 6, following which the line 18 is passed through the open trailing end 14d of the bore 14a until the looped end 18c emerges through the open leading end 14c. The fisherman can then fasten the looped end 18c to a connector swivel (not shown) of the primary line and slide the body 12/casing 14 on line 18 against the arcuate hook portion 20b. The retaining member 30 is then slid along the line 18 until it abuts the open leading end 14c of the casing bore 14a, FIG. 7. The modified lure is then ready for us in fishing.

While the invention has been described in terms of specific preferred embodiments thereof, it is not intended to be limited thereto but rather only to the extent set forth hereafter in the following claims. For example, although the lure 10 has been described as having a soft, plastic body, the body may made of a rigid, inflexible material, such as metal, hard plastic, or wood, within the scope of the invention.

I claim:

1. A fishing lure, comprising a relatively soft, pliable plastic body having an elongated passage therethrough, a relatively rigid tubular casing received in the passage, said casing including a bore having an open leading end and an open trailing end, a length of fish line received in the bore through said open leading end, and a hook having a shank portion received in the bore through said open trailing end and connected to the line in said bore.

2. The lure of claim 1 wherein the shank portion cf the hook is nested within the casing proximate the open trailing end of said bore.

3. The lure of claim 2 wherein the hook includes an arcuate portion terminating in a hook tip, said open trailing end of the casing engaging said arcuate portion.

4. The lure of claim 1 including a retainer member slidably mounted on the line exterior of the bore proximate the open leading end thereof so as to bear against said open leading end when the lure is pulled through the water.

5. The lure of claim 4 wherein the retainer member partially closes off said open leading end to meter flow of water through the bore when the lure is pulled through the water.

6. The lure of claim 1 wherein the body is shaped to resemble a live bait.

7. The lure of claim 1 wherein said bore provides a flow path for water through the interior of the lure body as the lure is pulled through the water.

8. The lure of claim 7 wherein a fish attractant dispenser is disposed in the bore to impart a fish attracting scent or color to the water flowing through the bore and exiting through the open trailing end.

9. The lure of claim 8 wherein the dispenser comprises a length of pipe cleaner bearing the fish attractant thereon.

10. The lure of claim 9 wherein the pipe cleaner has one end attached to the retainer member.

11. The lure of claim 9 wherein the pipe cleaner has one end that is held in a bore in the retainer member by friction.

12. A lure enhancement kit adapted for use with a soft, plastic-bodied lure, said kit comprising an elongated substantially non-collapsible tubular casing having a bore with open opposite bore ends, said casing being adapted for insertion in a passage formed in the soft, plastic-bodied lure, and a length of flexible fish line having one end connected to a shank portion of a hook and another free end, said length of line being adapted for accommodation in the bore of said casing such that the shank portion of the hook is disposed in the bore proximate one open bore end and the free end of the line extends through the other open bore end.

13. The kit of claim 12 including a retainer member slidably mounted on the line for engagement with said other open bore end.

14. The kit of claim 12 wherein the hook includes an arcuate portion terminating in a tip, said arcuate portion being engageable by said open trailing end.

15. The kit of claim 12 further including a fish attractant dispenser receivable in the bore with the line.

16. A method of making a lure, comprising providing a soft, plastic body, forming an elongated passage through the body, inserting a substantially non-collapsible tubular casing in the passage, said casing having a bore with an open leading end and an open trailing end, and placing a length of line in the bore with one end of the line extending through said open leading end and with another end of said line connected to a shank portion of a hook received in the bore through said open trailing end.

17. The method of claim 16 including connecting the shank portion of the hook to said another end of the line prior to placing of the line in said bore, and then passing said one end of the line through the open trailing end, the bore, and then through the open leading end until the shank portion is received in the bore proximate said open trailing end.

18. The method of claim 16 including slidably moving a retainer member on the line and sliding the retainer member into engagement with said open leading end of the bore.

19. The method of claim 16 including positioning a fish attractant dispenser in the bore.

20. The method of claim 16 wherein the passage is formed by piercing the soft, plastic-bodied lure with a punch.

21. The method of claim 16 wherein said casing is inserted in said passage simultaneously with the forming of said passage.

22. The method of making the lure of claim 18 including forcing a pipe cleaner into a bore in the retainer and inserting the pipe cleaner into the tubular casing when the retainer member is moved into engagement with the open leading end of the bore.

* * * * *

UNITED STATES PATENT AND TRADEMARK OFFICE
CERTIFICATE OF CORRECTION

PATENT NO. : 5,142,811
DATED : September 1, 1992
INVENTOR(S) : Carl W. Freeman

It is certified that error appears in the above-identified patent and that said Letters Patent is hereby corrected as shown below:

Column 4, line 9, after "is" insert -- received or nested --; line 17, after "the" second occurrence, insert -- swivel (not shown) and then slides the body 12/casing --; line 25, before "leading" insert -- slidably mounted on the line 18 proximate the open --; line 59, before "through" insert -- agent. The scented or colored water is discharged --.

Column 5, line 31, change "5" to -- 51 --; line 51, change "us" to -- use --; line 57, after "may" insert -- be --.

Column 6, line 3, change "cf" to -- of --.

Signed and Sealed this

Seventh Day of September, 1993

Attest:

*Attesting Officer*

BRUCE LEHMAN

*Commissioner of Patents and Trademarks*